US008203732B2

(12) United States Patent
Shiiyama

(10) Patent No.: US 8,203,732 B2
(45) Date of Patent: Jun. 19, 2012

(54) SEARCHING FOR AN IMAGE UTILIZED IN A PRINT REQUEST TO DETECT A DEVICE WHICH SENT THE PRINT REQUEST

(75) Inventor: Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1139 days.

(21) Appl. No.: 11/783,449

(22) Filed: Apr. 10, 2007

(65) Prior Publication Data
US 2008/0030792 A1 Feb. 7, 2008

(30) Foreign Application Priority Data

Apr. 13, 2006 (JP) ................................ 2006-111364

(51) Int. Cl.
*G06F 3/12* (2006.01)
*G06K 9/00* (2006.01)

(52) U.S. Cl. ....... 358/1.15; 358/402; 358/401; 358/400; 358/448; 358/468; 358/474; 358/1.9; 358/1.14; 358/1.16; 358/1.18; 358/1.1; 358/296; 358/426.01; 358/426.02; 358/426.04; 358/426.08; 358/426.12; 358/538; 382/181; 382/305; 707/E17.026; 707/E17.134; 707/E17.143; 707/E17.008; 707/E17.014; 707/E17.107; 707/E17.11

(58) Field of Classification Search .................. 358/402, 358/401, 403, 400, 1.9, 1.14, 1.15, 1.16, 358/1.18, 1.1, 296, 426.01; 382/128, 305; 707/E17.026, E17.134, E17.143, E17.008, 707/E17.014, E17.107, E17.11
See application file for complete search history.

(56) References Cited

U.S. PATENT DOCUMENTS

| 5,742,708 | A | 4/1998 | Yeh | |
|---|---|---|---|---|
| 6,628,417 | B1 * | 9/2003 | Naito et al. | 358/1.15 |
| 6,775,023 | B1 * | 8/2004 | Fukunaga et al. | 358/1.15 |
| 6,792,547 | B1 * | 9/2004 | Murata et al. | 726/5 |
| 7,088,854 | B2 * | 8/2006 | Cotman et al. | 382/165 |
| 7,454,061 | B2 * | 11/2008 | Yanagisawa et al. | 382/181 |
| 7,706,008 | B2 * | 4/2010 | Fukao et al. | 358/1.15 |
| 2004/0218837 | A1 * | 11/2004 | Shiiyama | 382/305 |
| 2005/0219665 | A1 * | 10/2005 | Mino | 358/537 |

(Continued)

FOREIGN PATENT DOCUMENTS

JP   9-186856   7/1997

(Continued)

OTHER PUBLICATIONS

Japanese Office Action dated Sep. 9, 2011 issued during prosecution of related Japanese application No. 2006-111364.

(Continued)

*Primary Examiner* — Steven Kau
(74) *Attorney, Agent, or Firm* — Fitzpatrick, Cella, Harper & Scinto

(57) ABSTRACT

Even if there are many printed images similar to a query image, this invention can effectively use a display window with a limited size and support to specify the print request source of each similar image by classifying and displaying the images according to additional information containing information indicating the print request source which has issued a print request for the image. Therefore, when a query image is input and images similar to the query image are found, the similar images are classified according to the user names of users who have printed them. The numbers of times of printing of the similar images and maximum similarities are displayed for the respective user names.

11 Claims, 24 Drawing Sheets

U.S. PATENT DOCUMENTS

2007/0091346 A1 * 4/2007 Ogura et al. ............ 358/1.14

FOREIGN PATENT DOCUMENTS

| JP | 2001-245089 | * | 9/2001 |
| JP | 2001-273302 | | 10/2001 |
| JP | 2001-320517 | | 11/2001 |
| JP | 2001245089 | * | 12/2001 |
| JP | 2004-21430 | | 1/2004 |
| JP | 2004-227391 | | 8/2004 |
| JP | 2005-49995 | | 2/2005 |
| JP | 2006-23834 | | 1/2006 |
| JP | 2006-081119 | | 3/2006 |
| JP | 2006-94482 | | 4/2006 |
| WO | 2006/030878 | | 3/2006 |

OTHER PUBLICATIONS

Kun-Seok Oh, et al., "Design Implementation and Performance Evaluation of Similar Image Retrieval System based on Self-Organizing Feature Map", vol. 100, No. 31, pp. 9-16.

Japanese Office Action dated Jun. 13, 2011 issued during prosecution of related Japanese application No. 2006-111364.

* cited by examiner

FIG. 7

| IP ADDRESS | EMPLOYEE CODE & PASSWORD | FINGERPRINT INFORMATION | USER NAME |
|---|---|---|---|
| 192.168.1.10 | 1234567, ##### | ###### | Yamada |
| 192.168.1.11 | 2345678, ##### | ###### | Suzuki |
| ......... | ......... | ......... | ......... |

FIG. 9

| DOCUMENT IMAGE ID | FULL-PATH FILE NAME | USER IDENTIFICATION INFORMATION | DEVICE NAME | OPERATION TYPE |
|---|---|---|---|---|
| 0000001 | C:¥img¥20021219101530.bmp | yamada | MFP1200 | PRN |
| 0000002 | C:¥img¥20021219112715.bmp | suzuki | MFP1200 | CPY |
| 0000003 | C:¥img¥20021219120545.bmp | kikuchi | PR2500 | PRN |
| ..... | ..... | ..... | ..... | ..... |

404d

| IMAGE ID | DOCUMENT IMAGE ID | IMAGE FEATURE CODE (GRAY) | IMAGE FEATURE CODE (COLOR) |
|---|---|---|---|
| 0000001 | 0000001 | Pc(1) ------------ Pc(81) | Pg(1) ------------ Pg(81) |
| 0000002 | 0000002 | ........ | ........ |
| 0000003 | 0000002 | ........ | ........ |
| 0000004 | 0000003 | ........ | ........ |
| 0000005 | 0000004 | | |

404c

F I G. 12

| 1 | 2 | 3 | 4 | 5 | 6 | 7 | 8 | 9 |
|---|---|---|---|---|---|---|---|---|
| 10 | 11 | 12 | 13 | 14 | 15 | 16 | 17 | 18 |
| ⋮ | ⋮ | ⋮ | ⋮ | ⋮ | ⋮ | ⋮ | ⋮ | ⋮ |
| --- | --- | --- | --- | --- | --- | --- | 71 | 72 |
| 73 | 74 | 75 | 76 | 77 | 78 | 79 | 80 | 81 |

FIG. 16

| | Qc( ) → | | | | | |
|---|---|---|---|---|---|---|
| | 1 | 2 | 3 | 4 | ········ | 27 |
| 1 | 0 | 1 | 2 | 3 | | |
| 2 | 1 | 0 | 1 | 2 | | |
| 3 | 2 | 1 | 0 | 1 | | |
| 4 | 3 | 2 | 1 | 0 | | 2 |
| ⋮ | | | | | | 1 |
| 27 | | | | 2 | 1 | 0 |

Pc( ) ↓

FIG. 17A
| USER | NUMBER OF HIT IMAGES | MAXIMUM SIMILARITY |
|---|---|---|
| yamada | 1 | 90 |
| Suzuki | 2 | 88 |
| kikuchi | 1 | 70 |
FIG. 17B
| USER | IMAGE THUMBNAIL | SIMILARITY | DEVICE NAME | OPERATION TYPE | DATE |
|---|---|---|---|---|---|
| yamada | | 90 | MFP1200 | PRN | 2002/12/19 |
RETURN
FIG. 17C
| USER | IMAGE THUMBNAIL | SIMILARITY | DEVICE NAME | OPERATION TYPE | DATE |
|---|---|---|---|---|---|
| Suzuki | | 88 | MFP1200 | CPY | 2002/12/20 |
| | | 85 | PR2500 | PRN | 2002/12/21 |
RETURN
FIG. 17D
| USER | IMAGE THUMBNAIL | SIMILARITY | DEVICE NAME | OPERATION TYPE | DATE |
|---|---|---|---|---|---|
| kikuchi | | 70 | MFP1200 | CPY | 2002/12/21 |
RETURN

FIG. 18
| CLASS | REPRESENTATIVE IMAGE OF CLUSTER | NUMBER OF IMAGES | MAXIMUM SIMILARITY | NUMBER OF USERS |
|---|---|---|---|---|
| 1 | 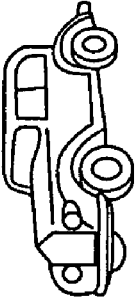 | 5 | 94 | 3 |
| 3 |  | 4 | 75 | 2 |
| 4 |  | 3 | 62 | 2 |

F I G. 20
| CLASS | REPRESENTATIVE IMAGE OF CLUSTER | NUMBER OF IMAGES | MAXIMUM SIMILARITY | NUMBER OF USERS |
|---|---|---|---|---|
| COLOR IMAGE | 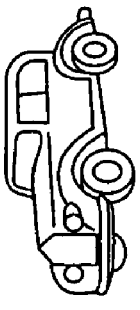 | 12 | 94 | 3 |
| MONOCHROME IMAGE | 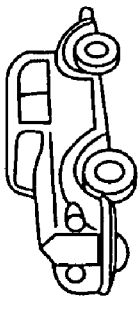 | 37 | 95 | 5 |

FIG. 22
| CLUSTER ID | REPRESENTATIVE IMAGE OF CLUSTER | NUMBER OF IMAGES | MAXIMUM SIMILARITY | NUMBER OF USERS |
|---|---|---|---|---|
| 001 |  | 5 | 90 | 3 |
| 002 |  | 4 | 65 | 2 |
| 003 |  | 3 | 60 | 2 |

SEARCHING FOR AN IMAGE UTILIZED IN A PRINT REQUEST TO DETECT A DEVICE WHICH SENT THE PRINT REQUEST

BACKGROUND OF THE INVENTION

1. Field of the Invention

The present invention relates to an image search technique.

2. Description of the Related Art

Conventionally, there has been known a technique of converting the character information contained in documents printed by a printer and document images obtained by document copying into character codes using a combination of a segmentation technique and an OCR and registering them in a full-text search apparatus (e.g., Japanese Patent Laid-Open No. 9-186856). In addition, there has also been known a technique of searching document image data and a PC which has printed it and finding a cause of information leakage (e.g., Japanese Patent Laid-Open No. 2006-81119).

In an environment in which a network is used and many users use PCs, e.g., in a company, however, many printing operations are performed. Consequently, many document images are hit by search processing. This makes it difficult to find a document image that has been leaked out from the found document images and specify the PC which has printed it or the user of the PC.

SUMMARY OF THE INVENTION

The present invention has been made in consideration of the above problem, and has as its object to provide a technique of easily specifying a print request source which has printed a similar image even if there are many images similar to a query image.

In order to solve this problem, for example, an image search server of the present invention has the following arrangement.

There is provided an image search server which searches for an image similar to a query image transmitted from a search client on a network, comprising, first reception means for receiving image data to be printed and additional information containing at least information indicating a print request source of the image data from a device having a printing function on the network;

registration means for registering received image data, feature amount information extracted from the image data, and additional information in storage means;

second reception means for receiving an image search request from a search client on the network;

search means for, when the second reception means receives a search request, extracting feature amount information from a query image contained in the search request and searching for an image similar to the query image by using the extracted feature amount information;

classifying means for classifying the found image on the basis of additional information of the found image; and search result transmitting means for transmitting the classification result as a search result to the search client.

According to the present invention, even if there are many printed images similar to a query image, the present invention can effectively use a display window with a limited size and support to specify the print request source of each similar image by classifying and displaying the images according to additional information containing information indicating the print request source which has issued a print request for the image.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing the data structure of a user DB managed by the management server;

FIG. 9 is a view showing the data structure of an image management DB managed by the management server;

FIG. 12 is a view showing the relationship between each divided image area and an index;

FIG. 16 is a view showing an example of a table used to obtain the similarity of each image;

FIGS. 17A to 17D are views showing an example of a search result GUI in this embodiment;

FIG. 18 is a view showing an example of a GUI in the second embodiment;

FIG. 20 is a view showing an example of a GUI in the third embodiment;

FIG. 22 is a view showing an example of a GUI in the fourth embodiment;

DESCRIPTION OF THE EMBODIMENTS

The embodiments of the present invention will be described in detail below with reference to the accompanying drawings.

<System Configuration>

This embodiment will exemplify the application of the present invention to a system which, when a printed document in a given company has been leaked out to the outside, supports to specify a user who has printed an image which is the leakage source.

Figure 1:
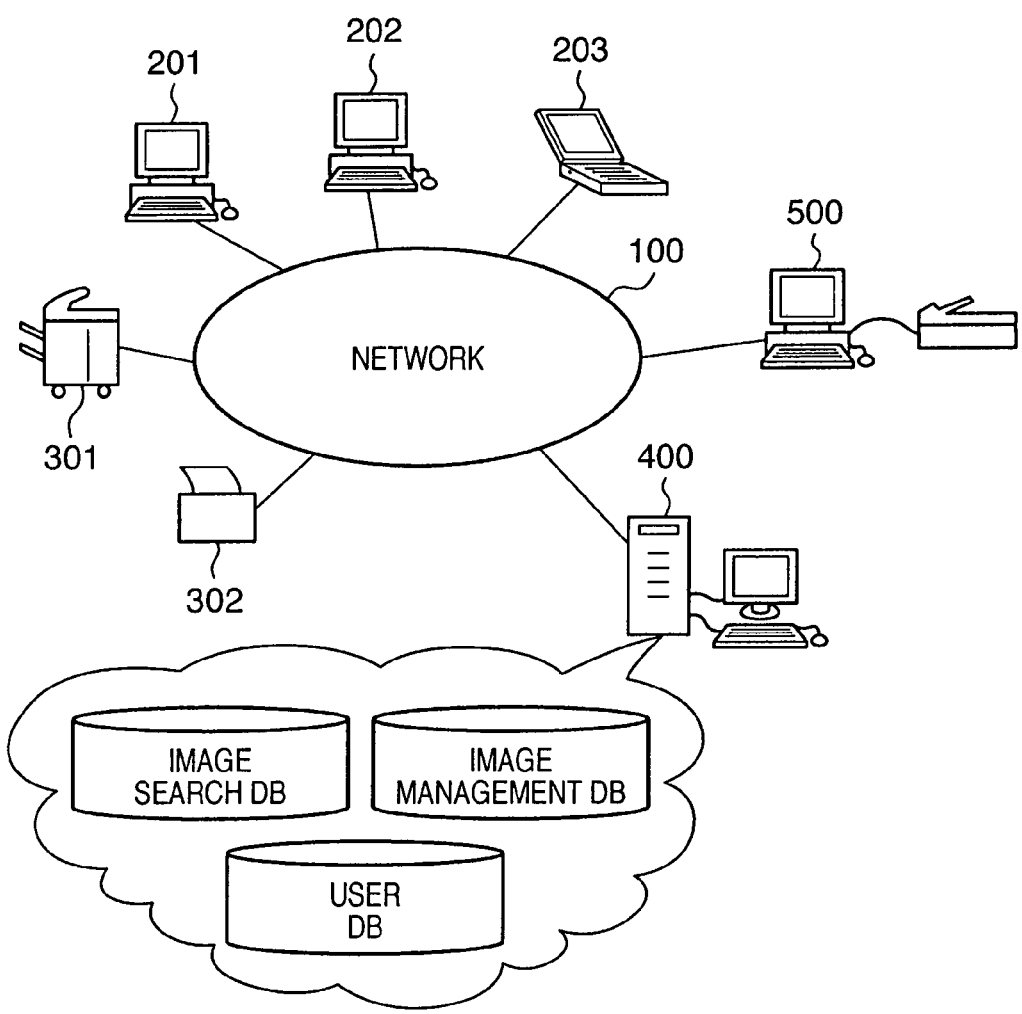
FIG. 1 is a view showing the arrangement of a network system according to an embodiment.

FIG. 1 is a view showing a network system in an embodiment. A network 100 includes general terminals 201 to 203 which output print data, a multi-function peripheral apparatus (to be referred to as an MFP hereinafter) 301 having a printing function and a copying function, a network printer 302, a management server 400 which is the core of the embodiment, and a search client 500 which issues a search request to the management server 400. In the case shown in FIG. 1, the system includes three general terminals, two apparatuses having a printing function, and one search client. However, the numbers of such components are not specifically limited.

Assume that the general terminals 201 to 203 are general-purpose information processing apparatuses such as personal computers, and have installed various kinds of application programs. The users of the general terminals 201 to 203 issue instructions to print documents by using desired applications, respectively. As a consequence, printer drivers executed on the general terminals 201 to 203 generate print data, and output the print data to the MFP 301 or the network printer 302.

The MFP 301 and the network printer 302 have network interfaces and functions of generating bitmap data by analyzing print data received from the network 100 and printing the data by outputting them to the printer engines. Note that the MFP 301 has a function (copying function) of reading a document set on the document table and printing the obtained image on a recording sheet by outputting the image to the printer engine.

Figure 2:
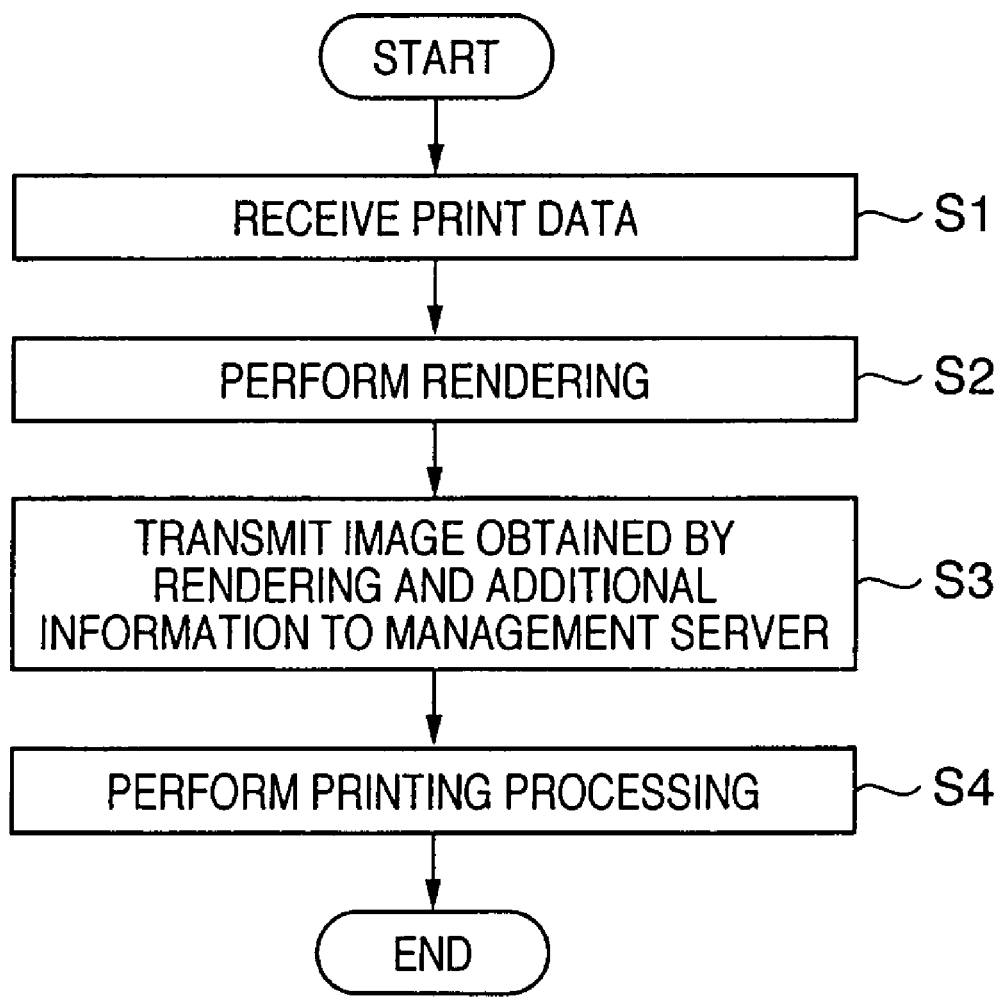
FIG. 2 is a flowchart showing a procedure for printing processing in a network printer and an MFP which is based on print data from a client in this embodiment.

FIG. 2 shows a printing sequence in the MFP 301 or the network printer 302 for data received from a network. A ROM inside the apparatus stores a program for the processing procedure in FIG. 2, and a processor inside the apparatus executes processing in accordance with the program.

First of all, in step S1, the processor receives print data through the network interface. At this time, the memory (not show) inside the processor holds information (an IP address in this embodiment) which specifies the transmission source of the received data. In step S2, the processor interprets and renders the print data. That is, the processor generates bitmap image data for printing on the basis of the print data. Thereafter, in step S3, the processor generates additional information comprising information (IP address) which specifies the transmission source of the print data, information which indicates the attribute (indicating whether the data is color or monochromatic gray) of the bitmap data, the name of the self apparatus on the network 100, operation type information which indicates that the apparatus has printed as a network printer. The processor transmits the generated additional information and the bitmap image data obtained by rendering to the management server 400.

Upon completion of this transmission, the process advances to step S4 to print data on a recording medium such as a recording sheet on the basis of the bitmap image data obtained by rendering.

As described above, the MFP 301 and the network printer 302 in this embodiment have the processing function in step S3 in addition to the general processing function of a network printer.

Note that it suffices to determine whether given bitmap data is a color image or a gray image, by determining, when interpreting and rendering the received print data, whether the data contains color component data.

The MFP 301 also has the copying function, as described above. The contents of processing in which the MFP 301 executes the copying function will be described with reference to the flowchart of FIG. 3.

Figure 3:
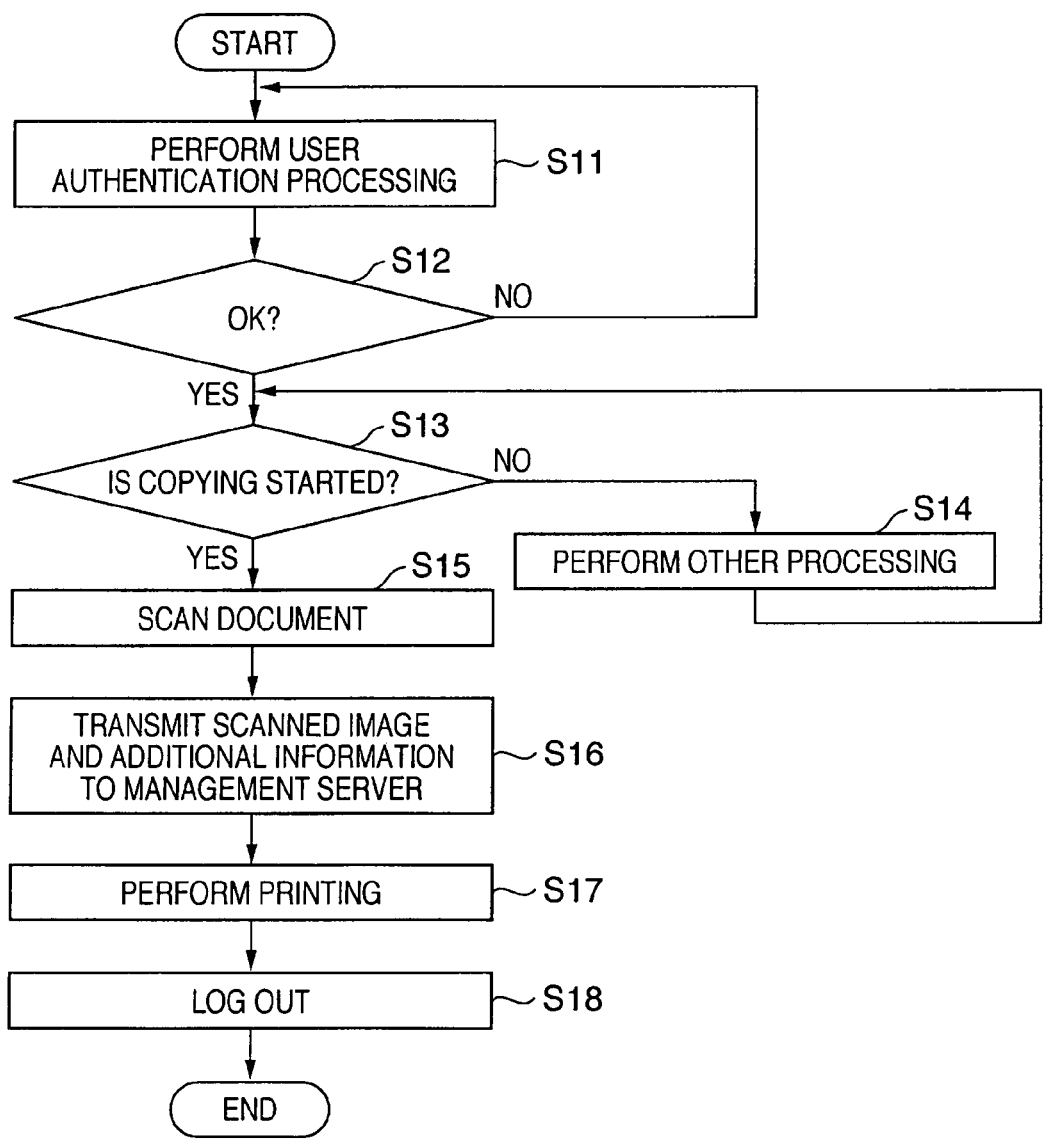
FIG. 3 is a flowchart showing a procedure for copying processing in the MFP in this embodiment.

The ROM inside the MFP 301 stores the program corresponding the processing shown in FIG. 3, and the processor inside the MFP 301 executes the processing in accordance with the program.

First of all, in step S11, the processor performs authentication processing for the user. Assume that this authentication processing is performed by causing the user to operate keys on an operation panel provided for the MFP 301 and input an employee code and a password. When the user inputs an employee code and a password, the processor of the MFP 301 transmits them to the management server 400, thereby issuing a request to determine whether the use of the MFP 301 is permitted. The management server 400 determines whether the received employee code and password match information registered in the user DB, and transmits the determination result to the MFP 301.

The processor of the MFP 301 receives this determination result, and determines in step S12 whether to permit/inhibit the use of the apparatus. Upon determining the inhibition of the use, the processor performs user authentication processing in step S11. That is, users other than those who are permitted to use the apparatus cannot perform copying operation.

If the processor determines the permission of the use in step S12, the process advances to step S13 to determine whether the user has pressed the copy start button of the operation panel. If the processor determines that the user has performed operation other than pressing the copy start button, the process advances to step S14 to perform the corresponding processing. The processing in step S14 includes selecting from color copying and monochrome copying.

If the processor determines that the user has pressed the copy start button, the process advances to step S15 to read the set document in the mode (color or monochrome) designated by the user.

The process advances to step S16 to generate additional information such as the identification information of the user (employee code), the name of the MFP 301 on the network, image attribute information indicating whether the image is color or monochrome, and operation type information indicating duplicate printing and transmit the additional information and the read image data to the management server 400.

The processor of the MFP 301 advances to the processing in step S17 to perform printing processing on the basis of the image data obtained by the reading operation. If the copying mode is the color copying mode, the processor performs color printing. If the copying mode is the monochrome copying mode, the processor performs monochrome printing (printing using only black ink or toner). In step S18, the processor makes the user log out.

According to the above description, the processor determines, depending on the copying mode designated by the user, whether a read document image is a color or monochrome image. It, however, suffices to always read documents as color images regardless of the types of documents and determine whether the read image contains any chromatic pixels.

According to the above description, in authentication processing, a user inputs an employee code and a password by using the operation panel of the MFP 301. It, however, suffices to perform authentication processing by using a fingerprint reader or an IC card reader.

As described above, each apparatus (the MFP 301 or the network printer 302 in this embodiment) having the printing function on the network in this embodiment transmits image data to be printed and additional information to the management server 400. The management server 400 registers the image data and additional information transmitted from the printer in the image search DB and the image management DB (to be described in detail later).

Figure 4:
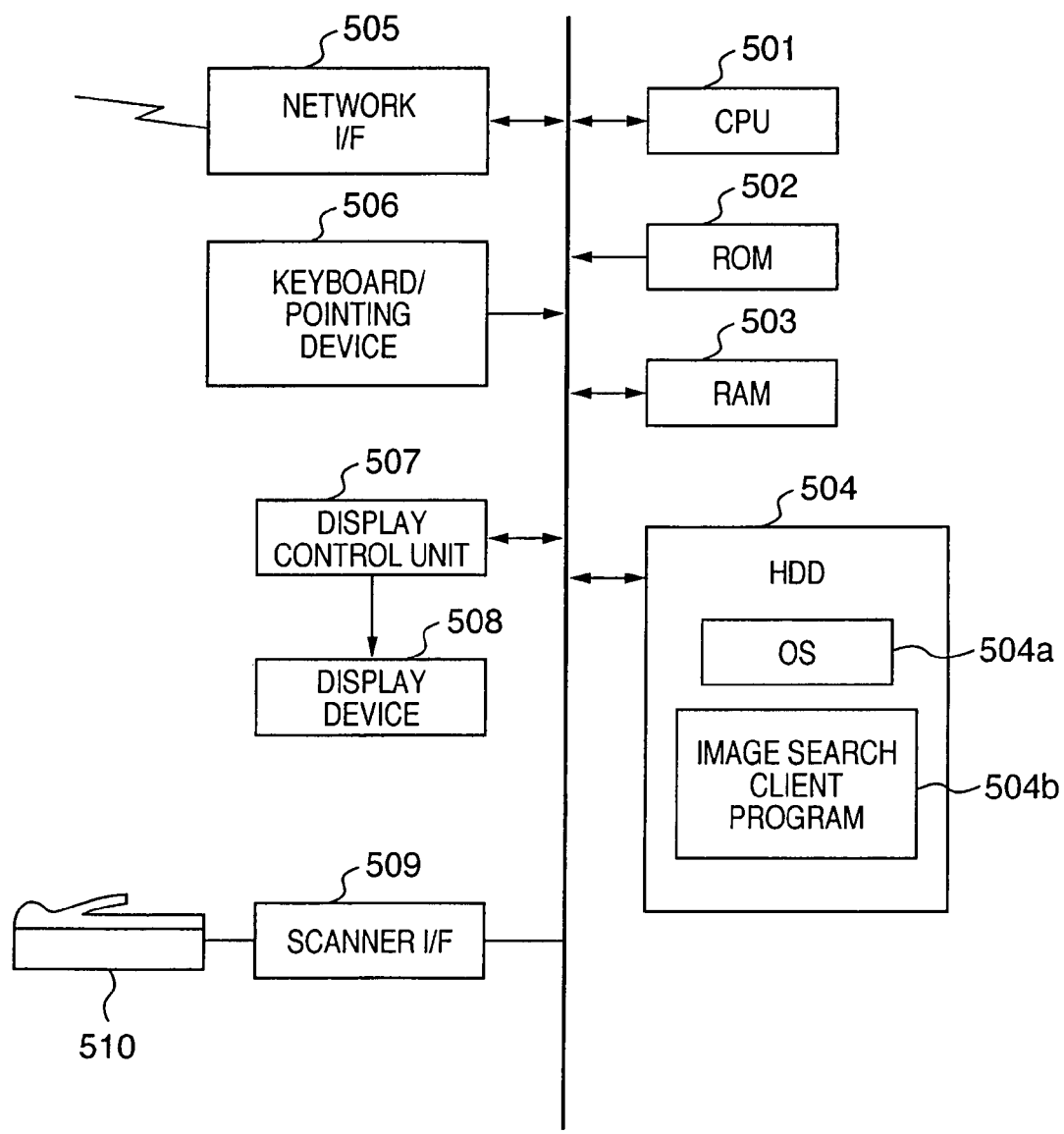
FIG. 4 is a block diagram showing the arrangement of a search client in this embodiment.

The structure of the search client 500 in this embodiment will be described next. FIG. 4 is a block diagram showing the arrangement of the search client 500. As described above, the search client 500 has a function of issuing a request to search for an image managed by the management server 400 and displaying the search result.

The hardware of the search client 500 has the same arrangement as that of a personal computer. That is, this arrangement comprises a CPU 501, a ROM 502 storing a BIOS and a boot program, and a RAM 503 used as a work area for the CPU 501. The arrangement also comprises a hard disk drive (HDD) 504 as an external storage device which stores an OS (Operating. System) 504a and an application program for an image search client (to be referred to as an image search client program hereinafter) 504b. In addition, the arrangement comprises a network interface 505 for communication with the network 100, an input device 506 comprising a keyboard and a pointing device, a display control unit 507 which performs rendering processing for the display memory, reads out data from the display memory, and outputs the read data as a video signal to a display device 508, and a scanner interface 509 which connects an image scanner 510.

When the user turns on the power supply of this apparatus, the CPU 501 loads the OS from the HDD 504 into the RAM 503 in accordance with the boot program in the ROM 502. Assume that the OS in this embodiment is a GUI-based OS (e.g., Windows® provided by Microsoft in the U.S.A.) The user then issues an instruction to execute the image search client program 504b by using the input device. As a consequence, the image search client program 504b is loaded into the RAM 503 and executed by the CPU 501.

The image search client program 504b may have a function of inputting the image data of a document set in the image scanner 510, a function of transmitting the read image as a query image to the management server 400, and a function of displaying the search result from the management server on the display device 508.

Figure 5:
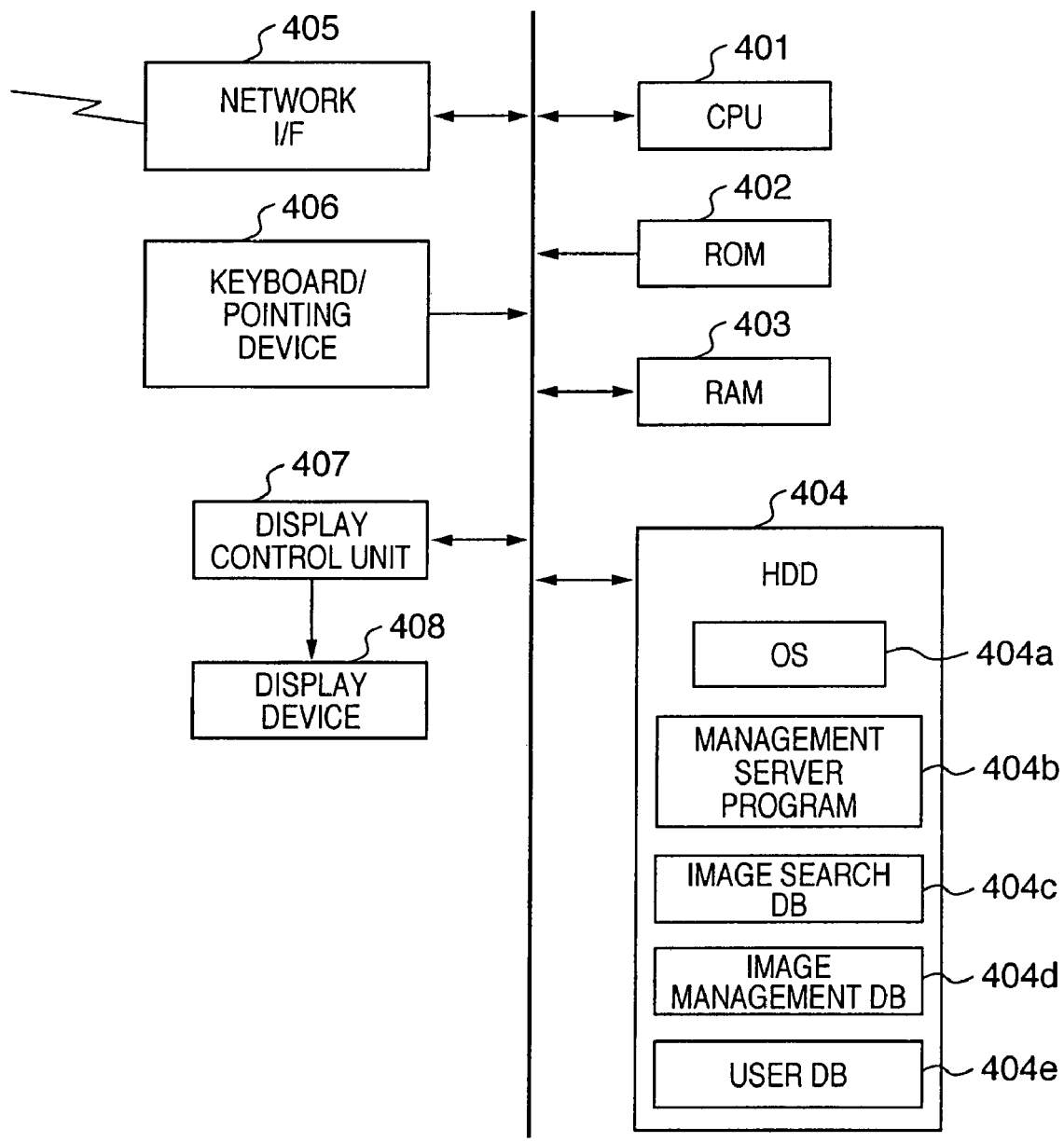
FIG. 5 is a block diagram showing the arrangement of a management server in this embodiment.

The structure of the management server 400 according to the embodiment will be described next. FIG. 5 is a block diagram showing the arrangement of the management server 400 in the embodiment. As described above, the management server 400 has a function of performing the processing of determining permission/inhibition of use in response to an authentication processing request from the MFP on the network 100, registration processing of printed image data, searching for an image similar to the query image received from the search client 500, and transmitting the search result to the search client 500.

The hardware of the management server 400 has also the same arrangement as that of a personal computer. This arrangement comprises a CPU 401, a ROM 402 storing a BIOS and a boot program, and a RAM 403 used as a work area for the CPU 401. The arrangement comprises an OS (Operating System) 404a and a hard disk drive (HDD) 404 as an external storage device storing a management server program 404b. The HDD 404 includes an image search DB 404c, an image management DB 404d, and a user DB 404e which are used during execution of the management server program 404b. The arrangement further comprises a network interface 405 for communication with the network 100, an input device 406 comprising a keyboard and a pointing device, and a display control unit 407 which performs rendering processing for the display memory, reads out data from the display memory, and outputs the read data as a video signal to a display device 408.

When the user turns on the power supply of this apparatus, the CPU 401 loads the OS for the server from the HDD 404 into the RAM 403 in accordance with the boot program in the ROM 402. The processor loads the management server program 404b into the RAM 403, and the apparatus starts operating as an apparatus which implements the above functions.

<Description of Processing by Management Server>

The contents of processing by the management server 400 in the embodiment will be described next.

Figure 6:
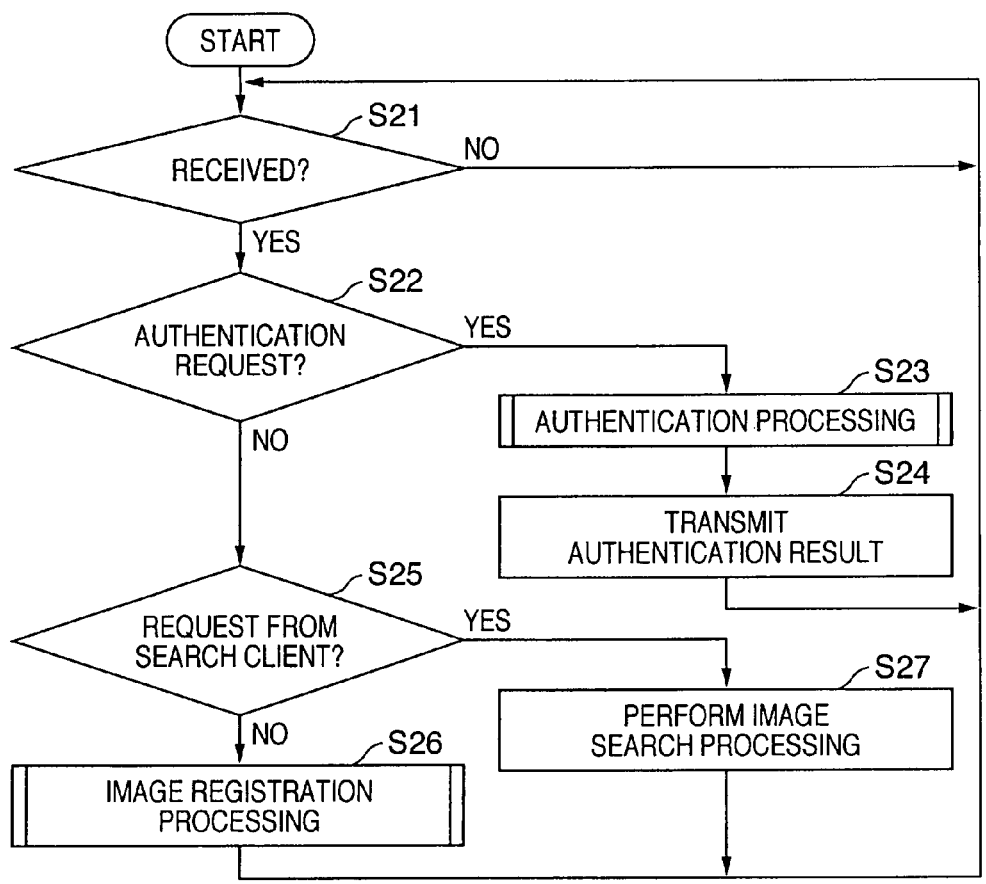
FIG. 6 is a flowchart showing main processing in the management server in this embodiment.

FIG. 6 is a flowchart showing the main processing based on the management server program 404b executed by the CPU 401 of the management server 400.

In step S21, the processor waits until the reception of some information from the network 100. If the processor determines that information has been received, the process advances to step S22 to determine whether the information is an authentication request for copying (logging in) by the MFP 301. If the processor determines that the information is an authentication request, the process advances to step S23. In step S23, the processor interprets the content of the authentication request, and determines whether the requested user identification information is registered in the user DB 404e.

The user DB 404e has a table structure like that shown in FIG. 7. Upon interpreting the authentication request from the MFP 301 and determining that it contains an employee code and a password, the processor searches a second field to determined whether it contains information which matches the employee code and the password. Although not shown in FIG. 1, an MFP may comprise a fingerprint reader, and the processor may perform authentication by using the reader. In this case, since the authentication request contains identification information indicating fingerprint information (in practice, feature information of a read fingerprint), the processor searches a third field.

In step S24, the processor transmits, to the MFP 301 as the source which has issued the authentication request, information indicating whether the user DB 404e contains information matching the above information.

If the processor determines in step S22 that the received information is not an authentication request, the process advances to step S25. In step S25, since this request is a request from the search client, the processor determines whether the request is an image registration request from the MFP 301 or the network printer 302.

If the request is an image registration request, the process advances to step S26 to register the received image data and additional information in the image search DB 404c and the image management DB 404d (to be described in detail later).

If the request is a search request from the search client 500, the process advances to step S27 to execute image search processing (to be described in detail later).

Figure 8:
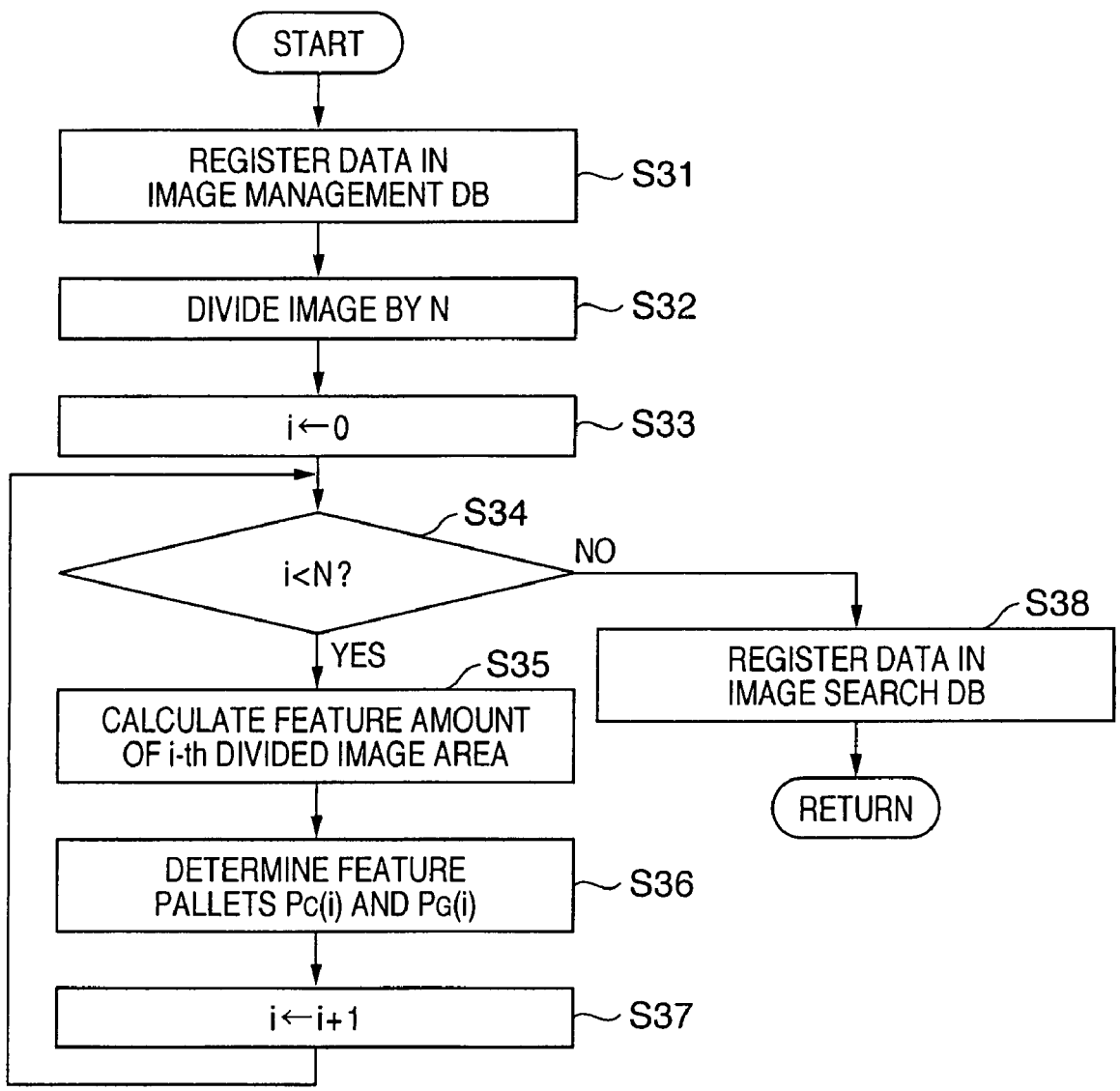
FIG. 8 is a flowchart showing the details of image registration processing in step S26 in FIG. 6.

The details of image registration processing in step S26 will be described next with reference to the flowchart of FIG. 8. In this processing, the management server 400 receives image data to be printed by the MFP 301 or the network printer 302 and additional information, and stores/holds them.

First of all, in step S31, the management server 400 stores received image data in a folder having a predetermined hierarchical structure in the HDD 404. The file name of the file to be stored is the date when the management server 400 has received the image data and the additional information, i.e., year/month/day/hour/minute/second. In addition, the management server 400 stores information in the image management DB 404d in accordance with the received additional information.

The image management DB has a table structure like that shown in FIG. 9. The first field contains document image IDs for specifying images. The management server 400 generates each document image ID by storing/holding the number generated at last and increasing the number by "1" every time a new image is registered. The second field contains full-path file names. The third field contains user identification information input when the corresponding images are printed or copied. The fourth field contains names on the network which specify the apparatuses which have printed the images. The fifth field contains operation types performed at the time of printing. The operation types include two types, i.e., "PRN" and "CPY". "PRN" indicates that printing was performed in response to a print job received from the general terminal 201 or the like. "CPY" indicates that copying was performed after a document was set. If, therefore, the management server 400 receives a registration request from the network printer 302, the operation type is "PRN". If the management server 400 receives a registration request from the MFP 301, the server stores either "PRN" or "CPY" in the fifth field depending on whether printing was performed by the network printer function or the copying function.

Additional information from the MFP 301 contains either an IP address or an employee code as information identifying the user. Referring to the user management DB makes it possible to uniquely specify a user name.

Note that the table shown in FIG. 9 is an example. If, for example, the MFP 301 or the network printer 302 transmits print date information as additional information, this table may include a field for storing it. However, the date when the management server 400 received an image registration request differs from the date when the MFP 301 or the network printer 302 executed a job by several seconds at most, and the date when the management server 400 received the request is used as a file name. This embodiment, therefore, does not handle the date information received from the MFP 301 or the like as a management target.

When the management server 400 completes storage of the image data as a file and registration in the image management DB 404d, the process advances to step S32. The processing in step S32 and subsequent steps is the processing for registration in the image search DB 404c.

First of all, in step S32, the management server 400 divides the received image data by a predetermined division number N. Assume that in this embodiment, the image data is divided into 9×9 areas. That is, N=81.

The process advances to step S33 to set the initial value "0" is set to a variable i. The variable i stores a value for specifying a divided area. As shown in FIG. 12, the relationship between i and the divided areas corresponds to a raster scan sequence.

In step S34, the management server 400 determines whether the variable i is less than N. If the management server 400 determines that i<N, since it indicates that there is an unprocessed area, the process advances to step S35.

In step S35, the management server 400 plots the value of each pixel existing in the ith divided image area in 3× 3×3 (=27) partial areas of an RGB color space. Each partial area of the color space is assigned a pallet number uniquely specifying each area. The pallet number of the partial area containing the largest number of plotted values is determined as the feature data of the ith divided image area. This pallet number is defined as Pc(i).

In the above description, the image data is color (chromatic) data. However, image data for which the MFP 301 or the like issues a registration request may be monochrome grayscale data. Even if the above image data is color image data, the query image received from the search client 500 may be a monochrome grayscale image.

For this reason, if the image data requested from the MFP 301 or a network printer is color image data, the management server 400 converts the color image data into monochrome grayscale image data by extracting only a luminance component. It suffices to obtain a luminance Y from RGB by using, for example, the following conversion formula:

$$Y=0.299\times R+0.587\times G+0.114\times B$$

A one-dimensional pallet of luminances Y is prepared in advance. The management server 400 then determines the average value of the luminances Y of all pixels contained in the ith divided image area as a grayscale pallet number Pg(i).

Note that when the MFP 301 and the network printer 302 are to print monochrome images, it is obvious that the management server 400 receives only monochrome image registration requests from these devices. If, therefore, an image for which a registration request has been received is a monochrome image, the management server 400 determines only the pallet number Pg(i) of the monochrome image without performing extraction processing of the pallet number Pc(i) of a color image.

When the management server 400 completes extraction of pallets Pc(i) and Pg(i) of feature data from the ith divided image area, the process advances to step S37 to increase the variable i by "1" and perform feature extraction from the next divided image area.

If the management server 400 determines in step S34 that i=N, since it indicates that the management server 400 has completed extraction of feature information from all the divided image areas, the process advances to step S38 to register the information in the image search DB 404c.

Figure 10:
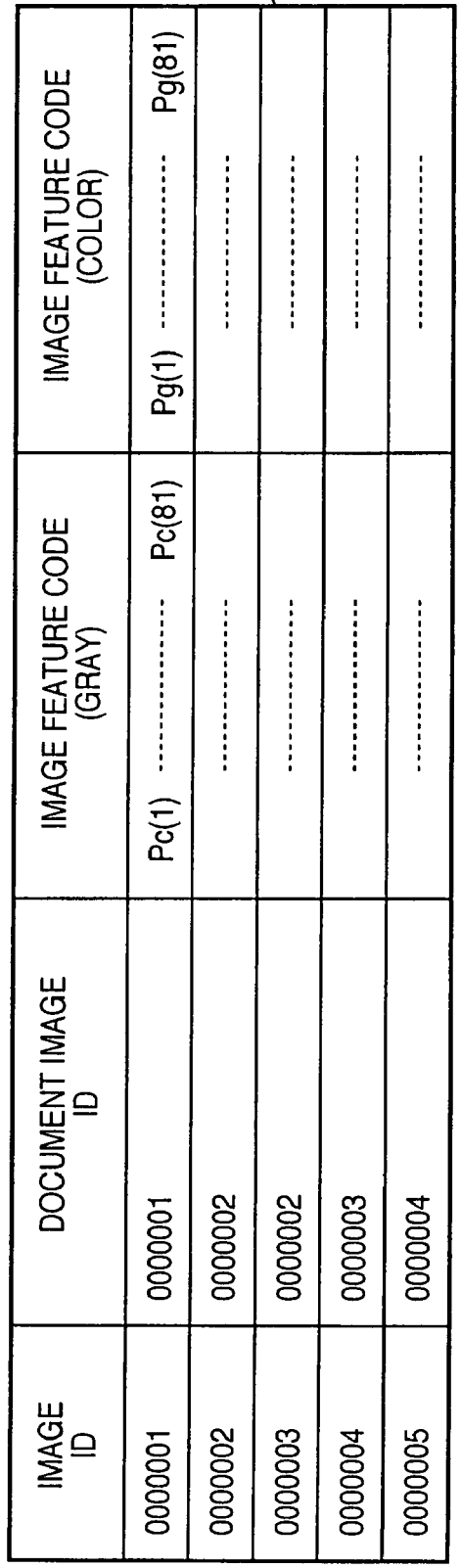
FIG. 10 is a view showing the data structure of an image search DB managed by the management server.
Figure 11:
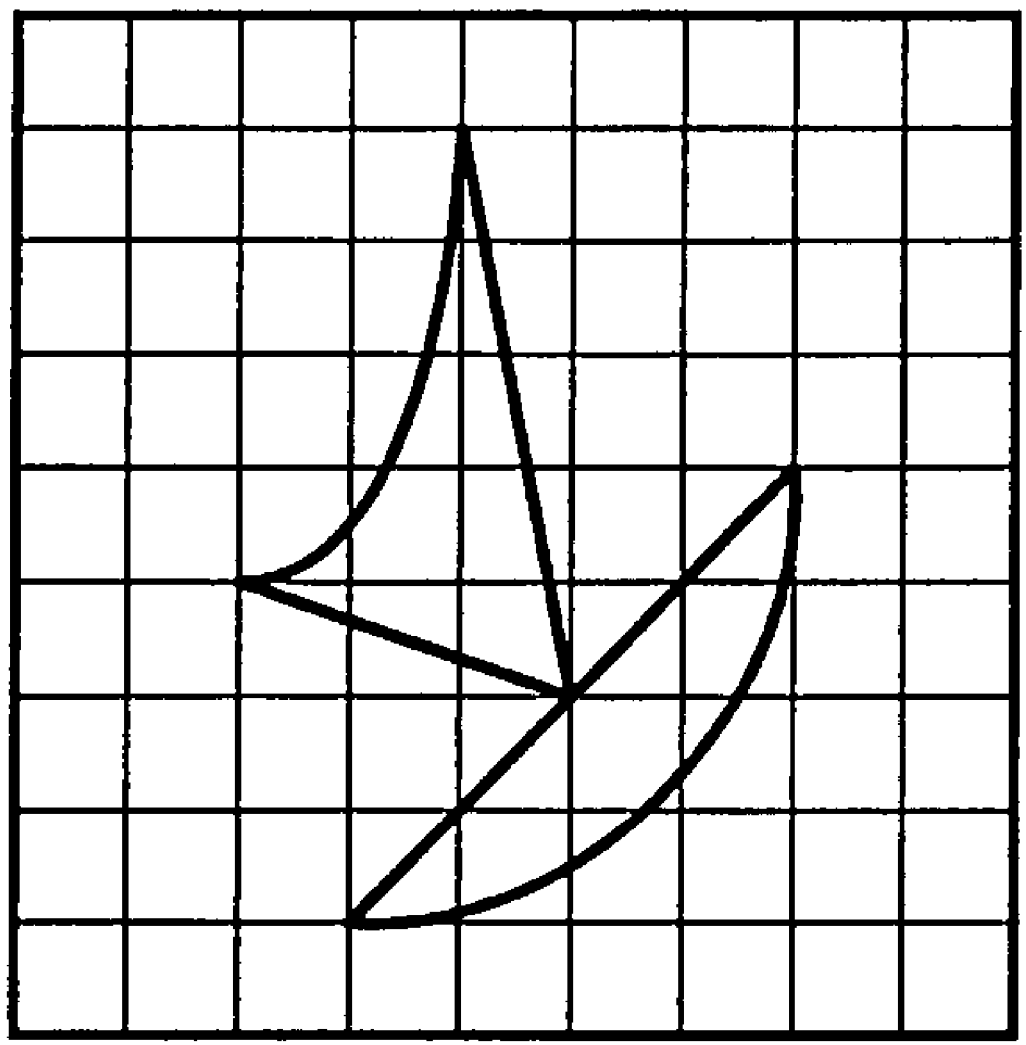
FIG. 11 is a view showing an example of image division for calculation of image feature amounts.
Figure 13:
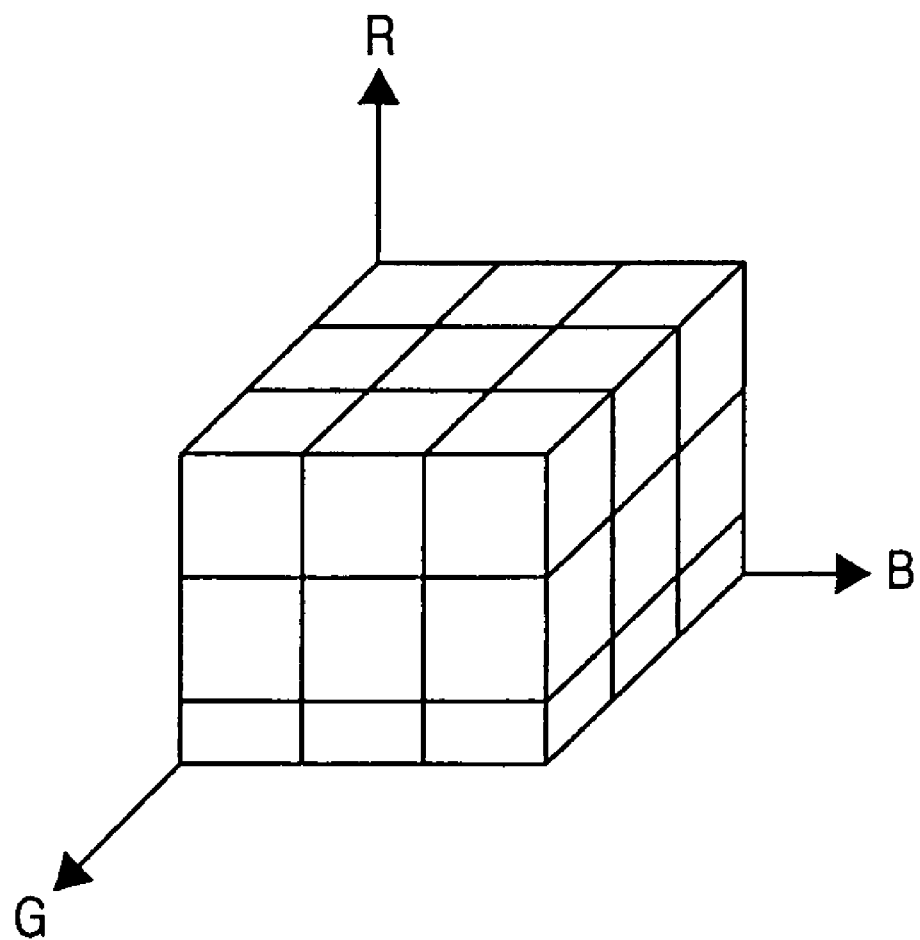
FIG. 13 is a view showing an example of color space division for calculation of the feature amount of a color image.

FIG. 10 shows the structure of the image search DB 404c in this embodiment. The first field stores an image ID which is used to specify an image subjected to search processing. The management server 400 generates such image IDs as well as document image IDs. The second field stores the document image IDs of the image management DB 404d. The second field associates the image search DB 404c with the image management DB 404d. Note that if image IDs have the same values as those of document image IDs, the first field may be omitted. The third field stores pallet numbers Pc(1) to Pc(81) of a color image. The fourth field stores pallet numbers Pg(1) to Pg(81) of a monochrome image. As described above, when the MFP 301 or the like has printed a monochrome image, the MFP 301 transmits only the monochrome image and its additional information to the management server 400. In this case, the third field stores impossible information (a value exceeding the maximum pallet number) or null.

The contents of search processing in step S27 in FIG. 6 will be described with reference to the flowchart of FIG. 14. This processing is performed when the management server 400 receives a query image from the search client 500.

First of all, in step S41, the management server 400 extracts a pallet number Qc( ) of a color image and a pallet number Qg( ) of a monochrome image as feature amounts from the received query image. This extraction processing is the same as that in steps S33 to S37 in FIG. 8. That is, it suffices to perform processing upon replacing Qc( ) with Pc( ), and Qg( ) with Pg( ). Note that if the query image is a monochrome image, the management server 400 does not extract the color pallet number Qc( ).

The process then advances to step S42 to determine whether the query image is a color image. In other words, the management server 400 determines whether it has extracted the pallet number Qc( ).

If the management server 400 determines that the query image is a color image, the process advances to step S43 to obtain the distance between the extracted pallet number Qc( ) and the pallet number Pc( ) of each image in the third field of the image search DB 404c so as to obtain a similarity, thereby searching for image data having a value equal to or more than a predetermined similarity. Although described in detail later, this search processing will extract the image ID of an image having high similarity with the query image and the similarity.

The process then advances to step S44 to perform search in the same manner as in step S43. Note, however, that in step S44, the management server 400 performs search processing to obtain the distance between the extracted pallet number Qg( ) and the pallet number Pg( ) of each image in the fourth field of the image search DB 404c.

In step S45, the management server 400 removes a redundant image ID as the search result on the color image and the monochrome image. If the processing in step S43 is not performed, it suffices to skip the removal processing in step S45.

As a result of the above operation, the management server 400 searches for the image ID of an image having a similarity equal to or more than a given threshold, the process advances to step S46 to generate information to be displayed to the search client. First of all, when executing step S46, the management server 400 generates information in the default display form. In step S47, the management server 400 transmits the generated display information to the search client.

Thereafter, in steps S48 and S49, the management server 400 determines whether the search client has issued a request to change the display form, and the end of the search processing is notified. When the management server 400 determines that the client has issued a request to change the display form, the process returns to step S46 to generate information in the requested display form.

Upon determining in step S49 that the notification of the end of search has been received, the management server 400 terminates this processing.

The details of step S43 will be described with reference to the flowchart of FIG. 15. Note that a query image is a color image, and the processing in step S43 is based on the color feature amount of the query image.

First of all, in step S51, the management server 400 determines whether search processing is complete for all the records in the image search DB 404c.

If NO in step S51, the process advances to step S52 to read the data of one record from the image search DB 404c. The read sequence in step S52 is from the start record in the image search DB 404c to subsequent records.

In step S53, the management server 400 determines whether the third field of the read record stores the significant color pallet number Pc( ). If NO in step S53, the process returns to step S51 to read the next record of the image search DB 404c.

When the management server 400 determines that there is a significant color pallet number Pc( ) in the read record, the process advances to step S54 to initialize the variable i to "0".

In step S55, the management server 400 increases the variable i by "1". The variable i serves to uniquely specify one of the color pallets Qc( ) and Pc( ).

Figure 16:
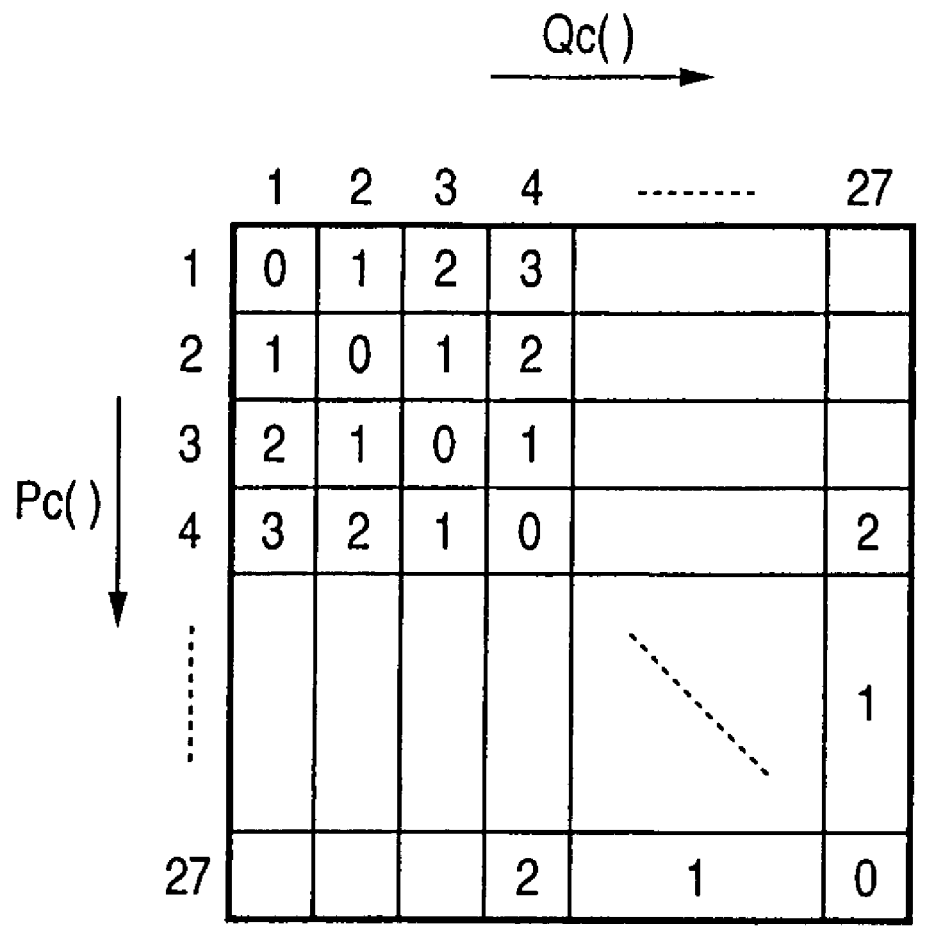

In step S56, the management server 400 obtains a distance D(i) between the color pallet number Qc(i) extracted from the query image and the color pallet number Pc(i) of the registered image. The management server 400 obtains the distance between the color at the position specified by Qc(i) in the color space and the color specified by the color pallet number Pc(i). In order to simplify computation, as shown in FIG. 16, this embodiment prepares a two-dimensional space table of Qc( ) and Pc(i) and extracts a value stored at the position indicated by two values in the table as a distance D(i). As is obvious from the table shown in FIG. 16, if Qc(i)=Pc(i), a value which makes the distance between them become "0". In step S57, the management server 400 determines whether the variable i is less than N. In other words, the management server 400 determines whether extraction of the distances between all the pallet numbers is complete. If NO in step S57, the management server 400 repeats the processing in steps S55 and S56.

When the management server 400 determines all distances D(i) in this manner, the process advances to step S58 to obtain a similarity L between the query image and the image of a record of interest in the image search DB 404c.

Basically, it suffices to obtain $\Sigma D(i)$ and evaluate that the smaller the obtained value, the higher the similarity between the two images. However, expressing it in percentage term, i.e., expression that 100% indicates perfect match between the two images, makes it easier for humans to understand. Therefore, letting Dmax be a maximum distance and $\Sigma$Dmax be the total sum of maximum distances, a similarity L was obtained as follows:

$$L=100\times\{\Sigma D\text{max}-\Sigma D(i)\}/\Sigma D\text{max}$$

When the management server 400 calculates the similarity L in this manner, the process advances to step S59 to compare the similarity with a predetermined threshold Th and determine whether L>Th holds. If the management server 400 determines that this relation holds, since it indicates that the image ID indicated by a record of interest in the image search DB 404c indicates an image with a high similarity, the management server 400 stores the ID in an area ensured in advance in the RAM 403 (step S60). In addition, the management server 400 determines, with respect to the image ID for which it is determined that L≦Th holds, that there is no similarity between the images, and hence the management server 400 does not store the ID in the RAM 403. In either case, the process returns to step S51.

As a result of the above operation, the management server 400 accumulates the image IDs of color images having certain similarities with the query image in the RAM 403.

Figure 14:
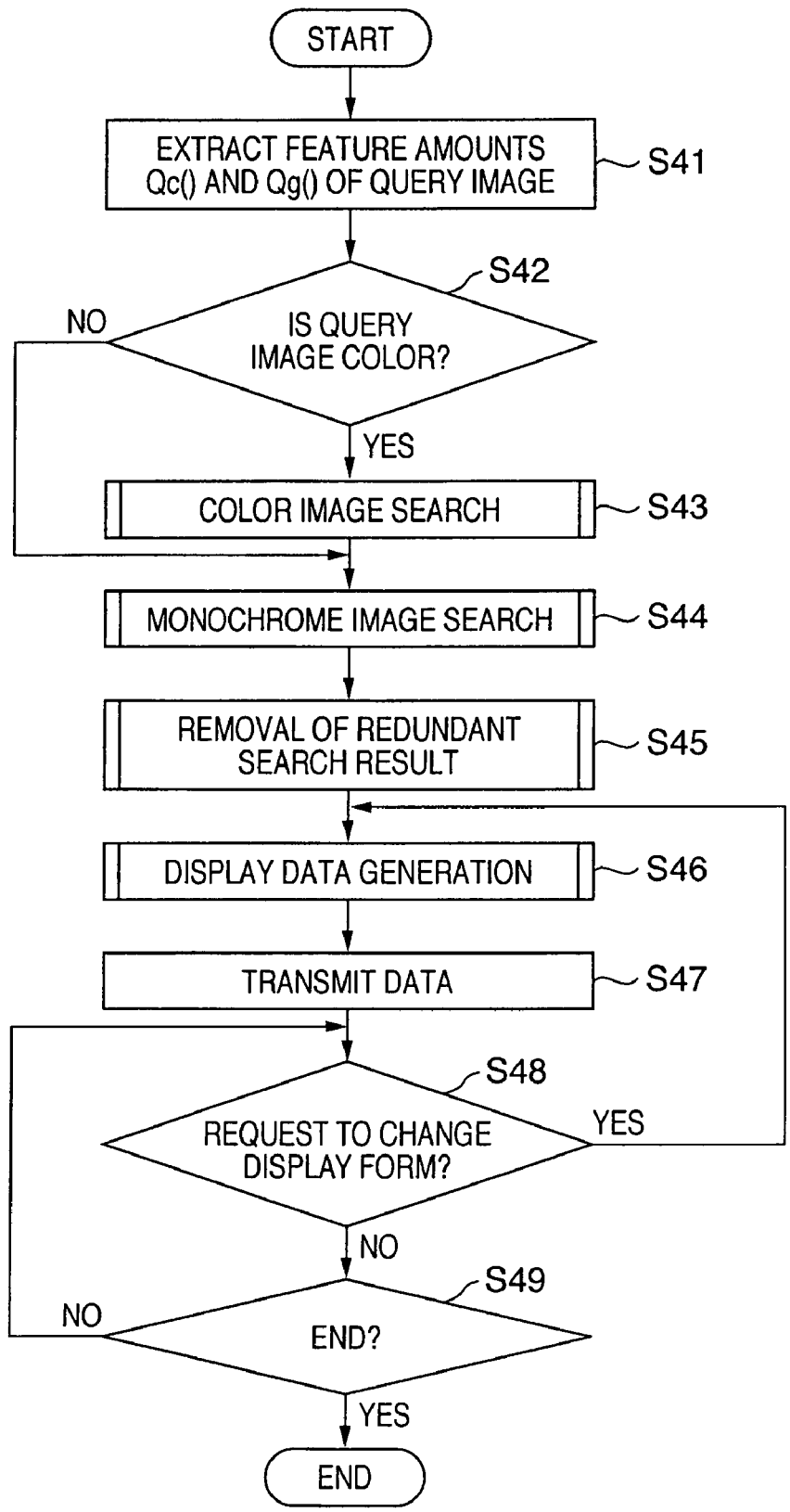
FIG. 14 is a flowchart showing a procedure for image search processing in step S27 in FIG. 6.
Figure 15:
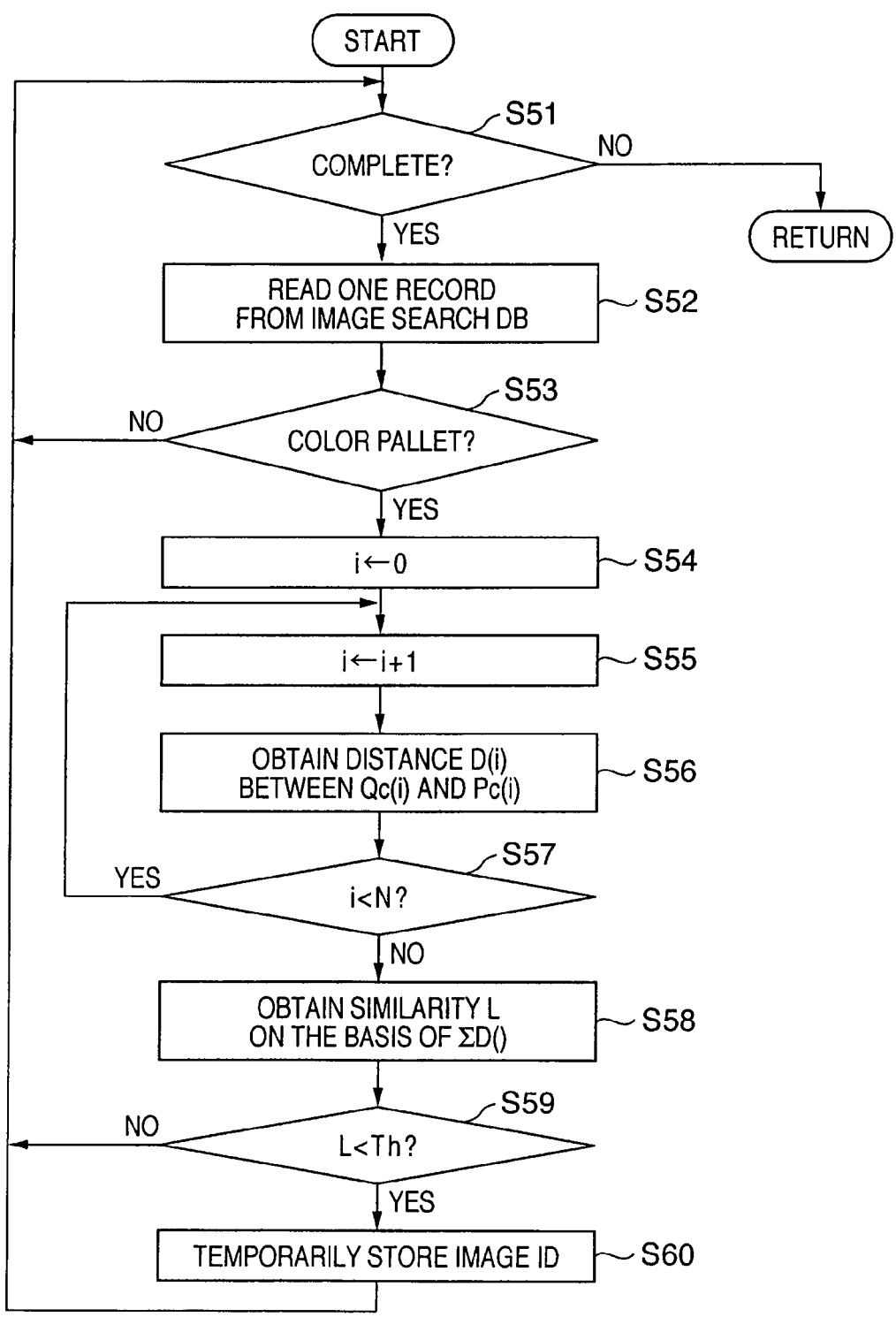
FIG. 15 is a flowchart showing the details of step S43 in FIG. 14.

Note that the processing in step S44 in FIG. 14 is obvious from the description made with reference to FIG. 15, and hence a description thereof will be omitted. Note, however, that the fourth field of the image search DB 404c always stores significant information as the pallet number Pg( ) of a monochrome image. In search processing for monochrome images, it is unnecessary to perform determination in step S53 in FIG. 15.

The processing in step S45 in FIG. 14 will be additionally described.

Assume that in search processing for color images, an image with the image ID "0000123" has a high similarity with a query image, and the similarity L is "70%". In addition, assume that in search processing for monochrome images, the similarity L of an image with the same image ID is "80%". In this embodiment, in the above case, the higher similarity is determined as the final similarity L of the image ID "0000123".

The processing in steps S46 to S48 in FIG. 14 and a specific example of the processing will be described next with reference to FIGS. 17A to 17D.

FIG. 17A shows the default display form to be used when the management server 400 performs the processing in step S46 first. FIG. 17A also shows a GUI displayed on the display device 508 of the search client 500.

The first column displays the user names of users who have printed images similar to a query image. The second column displays the numbers of times the users have printed (the numbers of similar images). The third column displays the maximum similarities of the similar images. Note that user names can be obtained by obtaining document image IDs from image IDs obtained by search and searching the image management DB 404d with the document image IDs as keys.

FIG. 17A indicates that there are four images similar to the query image, and there are three users with the names "yamada", "suzuki", and "kikuchi", who have printed the images. FIG. 17A indicates that the user with the name "suzuki" has printed similar images twice, and the remaining users each have printed once. Therefore, making the search client 500 read a document suspected of being leaked out of the company and searching it can specify a user who has printed the document and a user who has printed it many times.

In this case, when the user of the search client 500 clicks the row on which "yamada" is displayed by using the pointing device of the input device 406 on the GUI shown in FIG. 17A, the search client 500 transmits a request to display the details of the user with the name "yamada" to the management server 400. As a consequence, the management server 400 returns from step S48 to step S46 in FIG. 14 to focus on designated "yamada", generate display data indicating the breakdown of the information, and transmit the result to the search client 500. FIG. 17B shows a display example displayed on the search client 500.

When the user clicks the "return" button on the GUI in FIG. 17B, the state shown in FIG. 17A is restored. FIG. 17C shows the detailed GUI of the user name "suzuki". FIG. 17D shows the detailed GUI of the user name "kikuchi".

Referring to FIGS. 17B to 17D, the management server 400 generates thumbnail images from registered image files. Each GUI displays a network device name of a device used to print the image (either the MFP 301 or the network printer 302 in the embodiment), information indicating whether the print is a copy or printed by using an application, and the date information (extracted from a file name).

When registering a new image, the management server 400 may generate its thumbnail image and store the full-path file name of the thumbnail image file. In this case, since it is unnecessary to generate any thumbnail image, the state shown in FIG. 17A can be quickly changed to each of the display forms shown in FIGS. 17B to 17D.

As described above, according to this embodiment, as long as an apparatus having a printing function connecting to the network performs printing, the printed images are unconditionally registered in the management server 400. The user of the search client 500 for image search can classify images similar to an image of a document suspected of being leaked out of the company according to the user names of users who have printed the images and display the number of hits and the maximum similarities by setting the document and making a scanner read it. Even if, therefore, many similar images are found, since they are classified according to the user names, it is easy to specify a suspicious person.

Although the embodiment uses an RGB space as a color space to which pallet numbers are assigned, it suffices to use other color spaces such as an Lab space. The embodiment has exemplified the case wherein the feature amount of an image is calculated with reference to colors if the image is a color image or with reference to luminance if the image is a monochrome image. However, the present invention is not limited to this. For example, the embodiment may use standard deviations, medians thereof, and the like. In addition, the division number of an image and the division number of a color space are not limited to those in the above embodiment. The division number of an image is preferably about 15×15.

<Second Embodiment>

The first embodiment displays, on the initial window obtained as a result of search, the numbers of times of printing and the maximum similarities among the printed images for the respective user names upon classifying the data according to the user names, as shown in FIG. 17A.

The second embodiment will exemplify a case wherein similarities are classified according to keys and displayed. The system configuration of this embodiment is the same as that of the first embodiment, and a description thereof will be omitted.

FIG. 18 shows a GUI which a search client 500 displays on the basis of the display information initially generated by a management server 400. As shown in FIG. 18, data are classified according to similarities as keys.

The second embodiment classifies images to four classes according to similarities, i.e., 90% or more, 80% or more, 70% or more, and 60% (=threshold Th) or more.

FIG. 18 shows thumbnails of images having maximum similarities of the class number "1" which are similarities of 90% or more with respect to a query image. In addition, FIG. 18 shows that in this class, the number of similar images is five, the maximum similarity is "94%", and the number of users who have printed these images is three. In the case shown in FIG. 18, there is no image corresponding to the class number "2". FIG. 18 also shows that in the class with the class number "3", the number of similar images is four, the maximum similarity is 75%, and the number of users is two.

Figure 19:
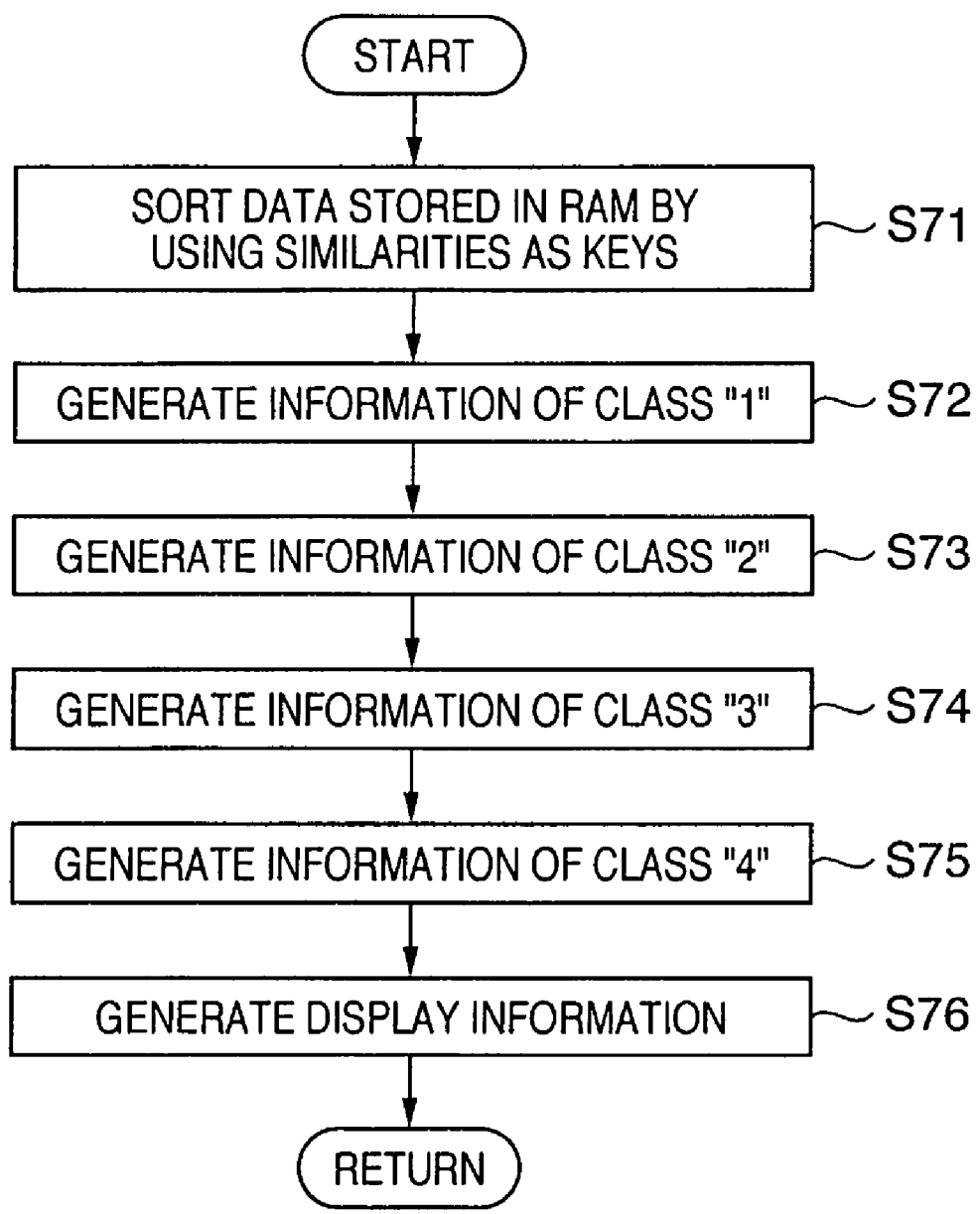
FIG. 19 is a flowchart showing the details of display data generation processing in the second embodiment.

When performing the above display operation, the management server 400 may perform the processing in FIG. 19 at the time of first execution of the processing in step S46 in FIG. 14. Note that a RAM 403 stores image IDs with similarities of 60% or more and similarity information thereof as a result of the processing in step S45 immediately before the above processing.

First of all, in step S71, the management server 400 sorts the image IDs and similarity information stored in the RAM 403 in descending order of similarities as keys.

The process then advances to step S72 to search for image IDs with similarities of 90% or more and extract image IDs belonging to class "1" and information to be displayed from the image management DB and the image search DB on the basis of the search result.

In step S73, the management server 400 searches for image IDs belonging to class "2" with similarities of 80% or more and less than 90% and perform extraction processing of information to be displayed.

In step S74, the management server 400 searches for image IDs belonging to class "3" with similarities of 70% or more and less than 80% and performs extraction processing of information to be displayed. In step S75, the management server 400 searches image IDs belonging to class "4" with similarities of 60% or more and less than 70% and performs extraction processing of information to be displayed.

When the management server 400 completes extraction of the information of all the classes, the process advances to step S76 to generate display information like that shown in FIG. 18.

Note that when the user selects one class on the display window in FIG. 18 with the pointing device, the information of the selected class is displayed in the form shown in FIG. 17A. Therefore, designating one user on the GUI in FIG. 17A makes it possible to display a list of images which the designated user printed, as shown in FIGS. 17B to 17D. In addition, data contained in selected classes may be displayed in the display forms shown in FIGS. 17B to 17D.

As a result of the above operation, the apparatus can classify images according to similarities as keys and allows to comprehend how many users belong to the respective similarities.

<Third Embodiment>

According to the first and second embodiments, upon receiving a color query image from a search client, the system extracts color and monochrome feature amounts from the query image, searches color images and monochrome images, and narrows down redundant image IDs to one.

Assume that an original color image stored in a company has been leaked out. Assume also that it is not clear whether the original color image is printed (including copying) as a monochrome image or a color image.

A monochrome image has no chromaticity but has only a grayscale value. It is therefore impossible to specify the original color from the luminance of each pixel of the monochrome image. That is, when a color image is input as a query image, it is necessary to consider the probabilities of a case wherein an image similar to the query image has been leaked out as a color image and a case wherein it has been leaked out as a monochrome image.

The third embodiment will exemplify a case wherein when a query image is a dolor image, color image search results and monochrome image search results are classified and displayed.

FIG. 20 shows a GUI which a search client 500 displays on the basis of the display information initially generated by a management server 400. As shown in FIG. 20, classification is performed according to color and monochrome images as keys. FIG. 20 shows that the number of color images similar to a query image is 12, the maximum similarity among them is "94", and the number of users who have printed the 12 images is three. FIG. 20 also shows that 37 similar images are found as a result of search on the basis of a monochrome query image (luminance in the embodiment) obtained by converting the color query image, the maximum similarity of the images is "95", and the number of users who have printed the 37 images is five.

Note that the image to be displayed in the second field of class "monochrome image" is not limited to a monochrome image. This is because this field indicates a similarity when it is assumed that an original color image is printed as a monochrome image.

Figure 21:
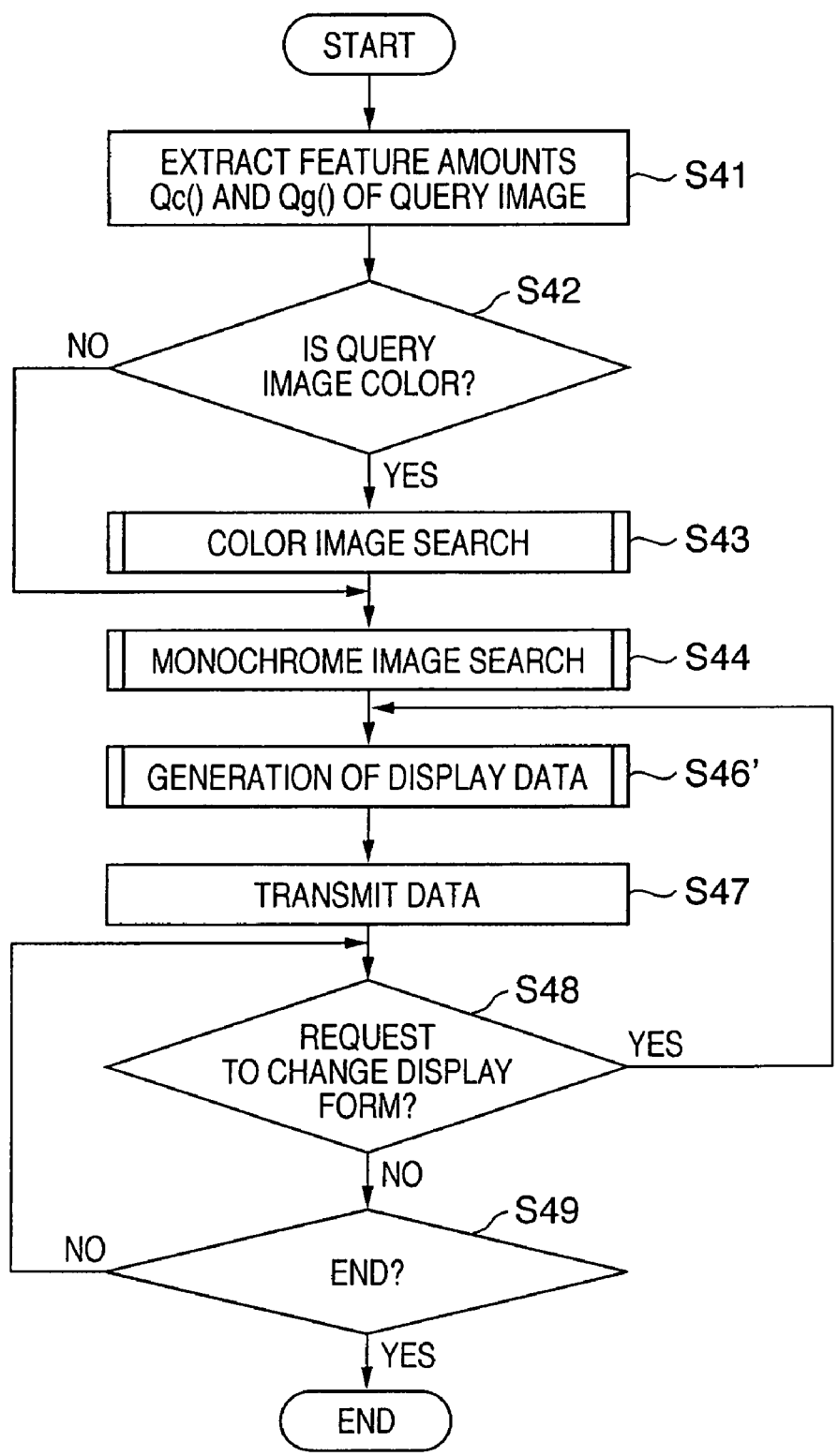
FIG. 21 is a flowchart showing a procedure for image search processing in step S27 in FIG. 6 in the third embodiment.

FIG. 21 shows the processing in the third embodiment. This flowchart differs from the flowchart of FIG. 14 in the first embodiment in that step S45 in FIG. 14 is omitted, and in step S46', as shown in FIG. 20, display data is generated on the basis of a color image search result (if any images are hit by search operation) and a monochrome image search result.

As described above, according to the third embodiment, when a color image is input as a query image, a search result can be displayed with consideration being given to both a case wherein the target color image is printed as a color image and a case wherein the target color image is printed as a monochrome image.

<Fourth Embodiment>

The second embodiment described above has exemplified the case wherein data are classified according to similarities as keys and displayed.

The fourth embodiment will exemplify a case wherein a plurality of found images are grouped into groups of similar images and displayed. This operation is performed because a plurality of found images are similar to a query image but are not often similar to each other. Note that the system configuration of this embodiment is the same as that of the first embodiment, and hence a description thereof will be omitted.

FIG. 22 shows a GUI which a search client 500 displays on the basis of the information initially generated by a management server 400 in the fourth embodiment.

Referring to FIG. 22, the management server 400 classifies 12 found images into three groups (cluster ID "001" to cluster ID "003") depending on whether they are similar to each other.

The group with cluster ID "001" includes five images. FIG. 22 shows that the management server 400 displays a thumbnail of an image, of these images, which is most similar to the query image, and the similarity of the displayed image is 90. In addition, FIG. 22 shows that three users have printed the five images. The same applies to cluster ID "002" and cluster ID "003".

Figure 23:
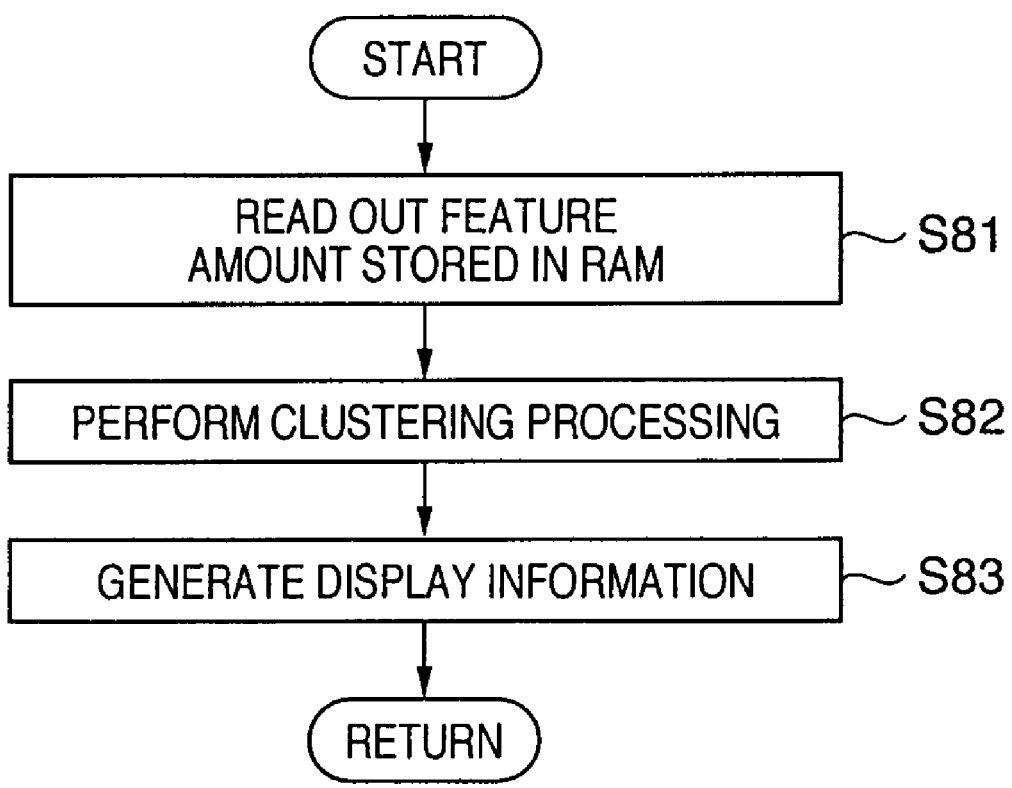
FIG. 23 is a flowchart showing the details of display data generation processing in the fourth embodiment.

When performing the above display operation, the management server 400 may perform the processing in FIG. 23 at the time of initial execution of step S46 in FIG. 14. Note that a RAM 403 stores image IDs with similarities of 60% or more, similarity information thereof, and the feature amount of each image as a result of the processing in step S45 immediately before the above processing.

First of all, in step S81, the management server 400 reads out the feature amount of each image from the RAM 403. In step S82, the management server 400 performs clustering processing (grouping) of the read feature amounts.

It suffices to perform this clustering processing by using a known algorithm, e.g., the NN (Nearest Neighbor) method, K-NN (K Nearest Neighbor) method, or K-average algorithm.

The process advances to step S83 to generate display information like that shown in FIG. 22.

Note that when a user selects one cluster on the display window in FIG. 22 by using a pointing device, the management server 400 displays information associated with the selected cluster in the form shown in FIG. 17A. Designating one user on the GUI shown in FIG. 17A makes it possible to display a list of images printed by the designated user as in the case shown in FIGS. 17B to 17D. Alternatively, it suffices to display data contained in the selected cluster in the display form shown in FIGS. 17B to 17D.

As a result of the above operation, clustering is performed according to the similarities between images with similarities equal to or more than a predetermined value, and the representative images of the display results are displayed. This makes it possible to group similar images and easily search for a target image.

<Fifth Embodiment>

This embodiment properly integrates hit images of registered monochrome images with a cluster of color images in the fourth embodiment, thereby improving the browsability of search results for the user.

This embodiment performs the same processing as that shown in FIG. 23. However, the embodiment differs from the fourth embodiment in that gray images are processed after color images are processed. That is, the processing in FIG. 24 is performed after the end of the processing in step S82.

Figure 24:
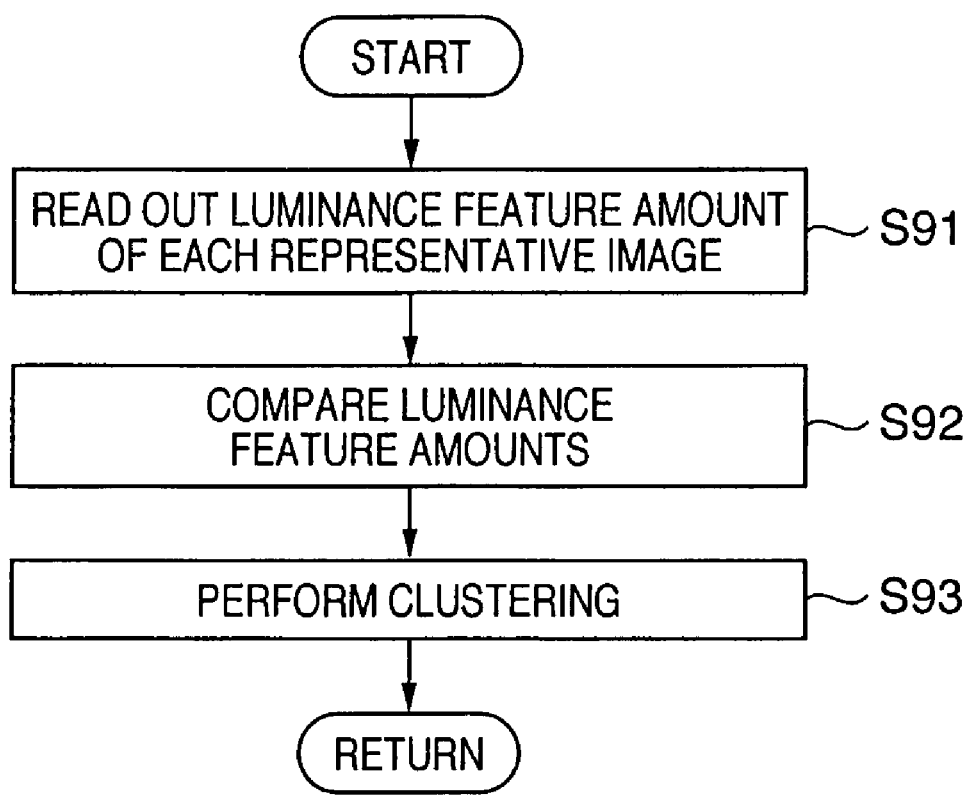
FIG. 24 is a flowchart showing the details of display data generation processing in the fifth embodiment.

In step S91 in FIG. 24, the luminance feature amount of a representative image of each cluster is read out from an image search DB 404c. In step S92, the luminance feature amount of each monochrome image is compared with the luminance feature amount of each representative image.

In accordance with the comparison results, each monochrome image is clustered into a cluster of color images to which the monochrome image is most similar.

As described above, the fifth embodiment can integrate search results according to color image features and luminance image features. In addition, the embodiment can efficiently present search results regardless whether a query image is a color image or a monochrome image.

The above embodiments have been described on the assumption that the search client 500 connects to the management server 400 through the network. However, it suffices to perform processing equivalent to a search client by using a management server. In this case, an apparatus which reads document images may connect to the management server 400. Furthermore, each embodiment has exemplified the case wherein a query image is input by the image scanner. However, it suffices to perform this input operation by using an image sensing device such as a digital camera. It also suffices to input an image stored in a storage medium as a query image.

The embodiments of the present invention have been described above. The core of each embodiment described above is the management server 400. This management server requires a network interface and a large-capacity storage device, but almost all the processing performed by the server can be implemented by computer programs. Obviously, therefore, the present invention incorporates the computer programs. In addition, computer programs are generally stored in a computer-readable storage medium such as a CD-ROM, and are set in a computer. The programs are then copied or installed in the system to be implemented. Obviously, therefore, the present invention incorporates such a computer-readable storage medium.

As many apparently widely different embodiments of the present invention can be made without departing from the spirit and scope thereof, it is to be understood that the invention is not limited to the specific embodiments thereof except as defined in the claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-111364, filed Apr. 13, 2006, which is hereby incorporated by reference herein in its entirety.

What is claimed is:

1. An image search server which searches for a print request having an image similar to a query image transmitted from a search client on a network, comprising:
 a first reception unit configured to receive a print request, from a device having a printing function on the network, which contains image data to be printed by the device and additional information containing at least information indicating a print request source of the image data;
 a registration unit configured to register the image data contained in the print request and which has been printed by the device, feature amount information extracted from the received image data, and the additional information in a storage unit;
 a second reception unit configured to receive a query image from a search client on the network;
 a search unit configured to extract feature amount information from the query image and search for an image from the registered image data which as been printed by the device based on the extracted feature amount information of the query image;
 a classifying unit configured to classify images found by said search unit, based on print request sources of the additional information of each of the found images; and
 a search result transmitting unit configured to transmit the classified images corresponding with the query image and the additional information corresponding with the classified images as a search result to the search client so that the search client can detect a device as the print request source which sent a print request for printing an image similar to the query image.

2. The server according to claim 1, further comprising:
 a first extraction unit configured to extract feature amount information of color image data; and
 a second extraction unit configured to extract feature amount information of monochrome image data obtained by converting the color image data into monochrome image data,
 wherein said registration unit registers the feature amount information extracted by said first extraction unit and said second extraction unit in said storage unit when image data for which a registration request is issued from said device is a color image, and registers the feature amount information extracted by said second extraction unit in said storage unit when image data for which a registration request is issued from said device is a monochrome image, and
 wherein said search unit searches said storage unit in accordance with the feature amount information extracted by said first extraction unit and said second extraction unit when a query image is a color image, and searches said storage unit in accordance with the feature amount information extracted by said second extraction unit when the query image is a monochrome image.

3. The server according to claim 1, wherein said classifying unit further performs classification in accordance with similarities of similar images.

4. The server according to claim 1, wherein said classifying unit divides images into a plurality of groups in accordance with similarities between found images.

5. The server according to claim 4, wherein said classifying unit selects representative images of said plurality of divided groups.

6. The server according to claim 5, wherein when found images include monochrome image data, said classifying unit classifies the monochrome image data by comparing feature amount information of the monochrome image data with feature amount information of monochrome image data obtained by converting the representative images into monochrome images.

7. The server according to claim 2, wherein said classifying unit further classifies the found images into an image printed as a monochrome image and an image printed as a color image.

8. The server according to claim 5, further comprising a display data generating unit configured to, when receiving a display request for details of one of classified classes from said search client after said search result transmitting unit transmits the search result, generate display data, for each similar image contained in a selected class, which comprises a user name of a user who has printed the image, a thumbnail of the similar image, a similarity, an identification name of a device which has printed the image, an operation type indicating whether the image has been printed by using a copying function or by the device serving as a network printer, and print date information, and transmitting the display data to said search client.

9. An image search system comprising a printing device having a printing function, an image search server apparatus which stores and manages images, and a search client apparatus which issues an image search request to said image search server apparatus and receives and displays a search result, wherein said printing device comprises:
a registration request unit for issuing a print request by transmitting image data as a print target and additional information including at least information indicating a print request source of the image data, to said image search server apparatus; and
a printing unit for printing out the image data as the print target onto a recording medium, wherein said search client apparatus comprises:
an input unit configured to input image data as a search target;
a search request unit configured to issue a search request by transmitting the input image data as a query image to said image search server apparatus;
a display unit configured to display a search result received from said image search server apparatus, and wherein said image search server apparatus comprises:
a registration unit configured to register image data for which the print request is issued by said printing device, feature amount information extracted from the image data, and the additional information in a storage unit when receiving the print request from said registration request unit of said printing device;
a search unit configured to extract feature amount information from the query image received from the search client apparatus and searching for an image similar to the query image by using the extracted feature amount information when receiving the search request issued from said search client apparatus;

a classifying unit configured to classify images found by said search unit, based on print request sources of the additional information of each of the found images; and
a search result transmitting unit configured to transmit the classified images corresponding with the query image and the additional information corresponding with the classified images as a search result to said search client apparatus so that the search client apparatus can detect a device as the print request source which sent a print request for printing an image similar to the query image.

10. A control method executed by an image search server which searches for a print request having an image similar to a query image transmitted from a search client on a network, comprising:
a first reception step of receiving a print request, from a device having a printing function on the network, which contains image data to be printed by the device and additional information containing at least information indicating a print request source of the image data;
a registration step of registering the image data contained in the print request and which has been printed by the device, feature amount information extracted from the received image data, and the additional information in a storage unit;
a second reception step of receiving a query image from a search client on the network;
a search step of, extracting feature amount information from the query image and searching for an image from the registered image data which has been printed by the device based on the extracted feature amount of the query image;
a classifying step of classifying images found by said search step, based on print request sources of the additional information of each of the found images; and
a search result transmitting step of transmitting the classified images corresponding with the query image and the additional information corresponding with the classified images as a search result to the search client so that the search client can detect the device as the print request source which sent a print request for printing an image similar to the query image.

11. A non-transitory computer-readable storage medium which stores executable code of a computer program that, when executed by a computer, performs the method according to claim 10.

* * * * *